United States Patent
Kim et al.

(10) Patent No.: US 8,402,285 B2
(45) Date of Patent: Mar. 19, 2013

(54) METHOD OF ENCRYPTING AND STORING DIGITAL CONTENT USING FIRMWARE REGIONAL CODE AND APPARATUS THEREFOR

(75) Inventors: Bong-seon Kim, Seongnam-si (KR); Jun-bum Shin, Suwon-si (KR); Chang-sup Ahn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 714 days.

(21) Appl. No.: 11/967,304

(22) Filed: Dec. 31, 2007

(65) Prior Publication Data

US 2008/0301472 A1 Dec. 4, 2008

(30) Foreign Application Priority Data

May 29, 2007 (KR) .................. 10-2007-0052217

(51) Int. Cl.
*H04L 9/32* (2006.01)
*G06F 7/04* (2006.01)
(52) U.S. Cl. ........ 713/193; 713/187; 713/188; 713/189; 713/190; 713/191; 726/27; 726/28; 726/29; 726/30
(58) Field of Classification Search ................ 713/193
See application file for complete search history.

(56) References Cited

U.S. PATENT DOCUMENTS

2006/0143472 A1* 6/2006 Feilen et al. .................. 713/189

FOREIGN PATENT DOCUMENTS

| CN | 1833284 A | 9/2006 |
| WO | 2005015557 A2 | 2/2005 |

OTHER PUBLICATIONS

Communication dated May 4, 2012 issued by the State Intellectual Property Office of P.R. China in counterpart Chinese Application No. 200810003658.2.
Communication dated Oct. 29, 2012 issued by the State Intellectual Property Office of P.R. China in counterpart Chinese Application No. 200810003658.2.

* cited by examiner

*Primary Examiner* — Longbit Chai
(74) *Attorney, Agent, or Firm* — Sughrue Mion, PLLC

(57) ABSTRACT

A method of processing digital content performed by an apparatus for storing digital content. In the method, a hardware regional code extracted from a memory of a content storage device is compared with a firmware regional code extracted from firmware, and the digital content is selectively encrypted and stored according to a corresponding regional code only when the hardware regional code matches the firmware regional code.

13 Claims, 3 Drawing Sheets

METHOD OF ENCRYPTING AND STORING DIGITAL CONTENT USING FIRMWARE REGIONAL CODE AND APPARATUS THEREFOR

CROSS-REFERENCE TO RELATED PATENT APPLICATION

This application claims priority from Korean Patent Application No. 10-2007-0052217, filed on May 29, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to storing digital content, and more particularly, to storing digital content that is encrypted according to a regional code of a storage device or firmware.

2. Description of the Related Art

The development of communication techniques and storage media has resulted in digital content that can be easily shared by many people. As a result, digital content can be easily stored and copied without experiencing any deterioration of quality. Accordingly, research is being actively conducted to prevent illegal copying of digital content. Therefore, there is a need for countermeasures to prevent the illegal distribution of digital content to unauthorized users.

In the United States, a method has been proposed in which a broadcast flag is used to prevent unrestricted copying of digital content. In this method, when a digital television (TV) or a private video recorder (PVR) receives and stores digital broadcast content including the broadcast flag, the content is stored after being encrypted so that a user cannot freely copy the stored content to another device. However, this method can only be effective when a storage device (e.g., digital TV, PVR, etc.) abides by the "broadcast flag rule."

However, in some regions, free distribution of digital content may be allowed without having to conform to the broadcast flag rule, and encryption methods may differ from one region to another. This is because content protection policies vary by region.

In general, therefore, storage devices are manufactured to cover a variety of regional policies. Firmware installed on a storage device differs depending on the regions where the storage device will be used, and thus whether to abide by a certain rule (e.g., broadcast flag rule) is determined by the firmware of the device.

Such firmware can be easily updated or reinstalled by the user. For example, when the user who has purchased a PVR made in the United States, where the broadcast flag rule is a mandatory, travels to another country where the broadcast rule is not mandatory, the user can download and copy digital broadcast content provided within the United States by simply downloading and installing firmware of the PVR.

Such a problem may also occur when using DVD videos. To prevent this, regional codes are written on a DVD video and a DVD player, so that the DVD video cannot be played if the regional codes differ from each other. In the DVD player, the regional code of the DVD video is recognized by firmware. This is because a specific regional code is set in the firmware by a DVD player manufacturer.

Accordingly, by simply modifying the firmware in the DVD player, all DVD videos can be played in a DVD player regardless of the regional code of a DVD video.

SUMMARY OF THE INVENTION

The present invention provides an apparatus and method in which a user cannot modify the original firmware of a digital content storage device.

According to an aspect of the present invention, there is provided a method of processing digital content performed by an apparatus for storing digital content, the method including: extracting a regional code from firmware installed in the apparatus; comparing the extracted regional code with a regional code stored in a memory; and selectively encrypting the digital content according to the comparison result.

The method may further include checking the integrity of the extracted regional code, wherein the comparing is performed only if the extracted regional code passes the integrity checking.

The method may further include checking the integrity of the regional code stored in the memory, wherein the comparing is performed only if the regional code stored in the memory passes the integrity checking.

The integrity checking of the extracted regional code may be performed using a signature or message authentication code (MAC) of the extracted regional code; and the signature or MAC may be extracted from the firmware.

The integrity checking of the regional code stored in the memory may be performed using a signature or MAC of the regional code stored in the memory, and the signature or MAC may be extracted from the memory.

The memory may be an electrically erasable and programmable read only memory (EEPROM).

According to another aspect of the present invention, there is provided a computer-readable medium having computer-readable program codes for executing the method described above.

According to another aspect of the present invention, there is provided an apparatus for storing digital content, including: a regional code extractor which extracts a regional code from firmware installed in the apparatus; a comparator which compares the extracted regional code with a regional code stored in a memory; and an encryption unit which selectively encrypts the digital content according to the comparison result.

The apparatus may further include an integrity checker which checks the integrity of the extracted regional code, wherein the comparator performs the comparing only if the extracted regional code passes the integrity checking.

The apparatus may further include an integrity checker which checks the integrity of the regional code stored in the memory, wherein the comparator performs the comparing only if the regional code stored in the memory passes the integrity checking.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
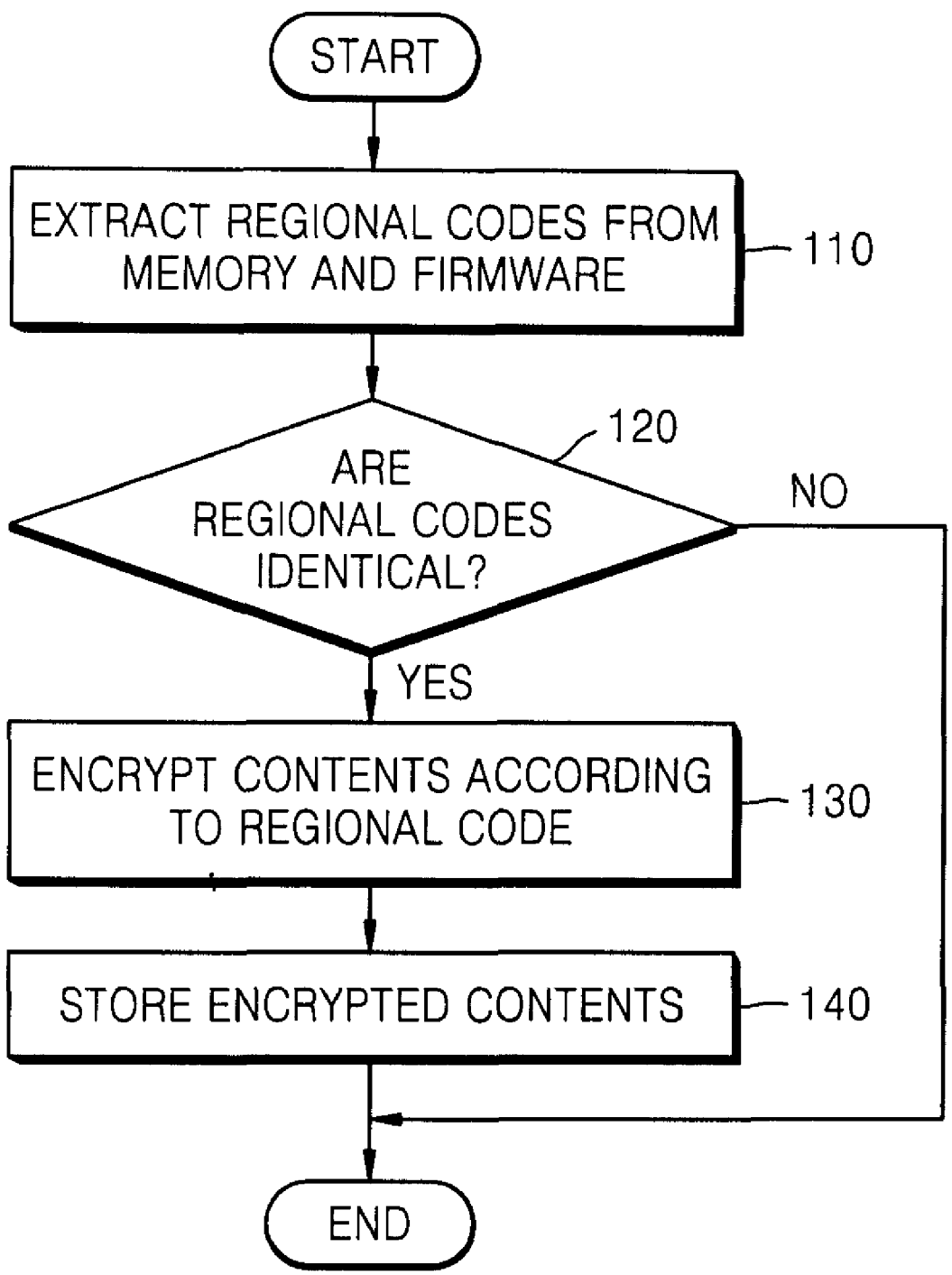
FIG. 1 is a flowchart of a method for storing digital content according to an exemplary embodiment of the present invention.

FIG. 1 is a flowchart of a method for storing digital content according to an exemplary embodiment of the present invention.

In the present invention, a digital content storage device and firmware installed in the storage device both have regional codes, and the digital content storage device can operate normally only when the two regional codes match (i.e., are the same). For example, when a regional code stored in the storage device is different from a regional code stored in firmware, booting may not be completed, or even if the booting is completed, functionality for storing digital content may be restricted. When the digital content storage device is booted, or when a user attempts to store digital content, operations are performed as follows.

In operation 110, the digital content storage device extracts regional codes from a memory and the firmware. Data stored in the memory has to be preserved even when power is not supplied. Therefore, such a memory may be an EEPROM.

In operation 120, the regional codes extracted from the memory and the firmware are compared with each other.

In operation 130, if the two regional codes are identical, the digital content is encrypted according to the regional code. The regional code may only decide whether to encrypt the digital content. In addition, the regional code may specify an encryption method. If the two regional codes are not identical, the digital content storage device operates abnormally.

In operation 140, the encrypted digital content is stored. Since the digital content is encrypted prior to being stored, the user cannot copy the unencrypted digital content to another device or post the unencrypted digital content on a Web site.

Figure 2:
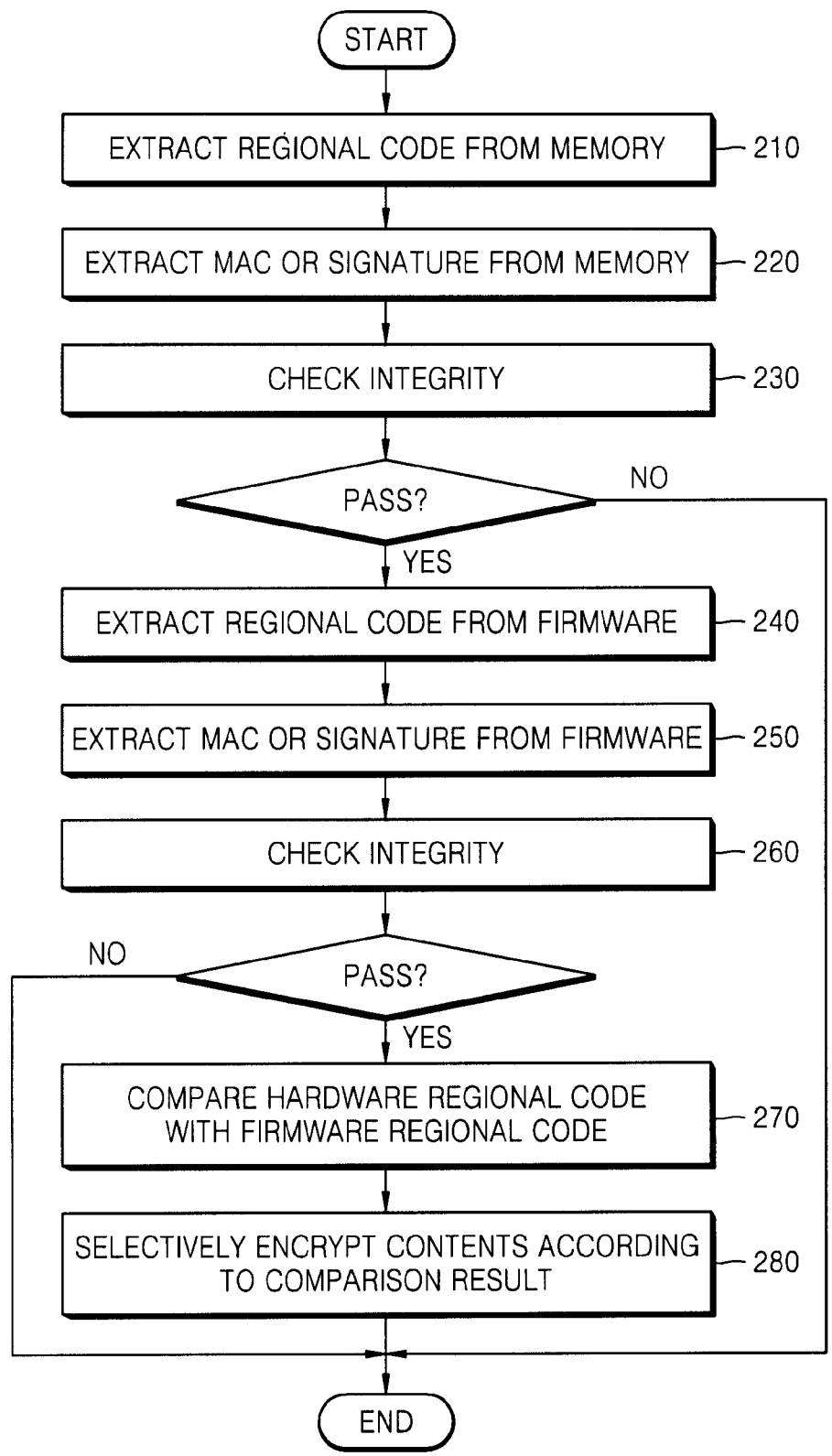
FIG. 2 is a detailed flowchart of a method of storing digital content according to an exemplary embodiment of the present invention.

FIG. 2 is a detailed flowchart of a method of storing digital content according to an exemplary embodiment of the present invention.

In operation 210, upon booting the digital content storage device, a regional code is extracted from a memory of the digital content storage device. The extracted regional code is a hardware regional code of the digital content storage device. As described above, the memory may be an EEPROM.

In operation 220, an MAC or a signature is extracted from the memory. The extracted MAC or signature is required to perform integrity checking on the hardware regional code extracted from the memory of the digital content storage device. Preferably, but not necessarily, the hardware regional code is compared with a firmware regional code after the integrity checking since the hardware regional code may change.

In operation 230, the integrity checking is performed using the extracted MAC or signature. The digital content storage device operates abnormally if the result of the integrity checking is not successful. On the other hand, upon passing the integrity checking, the procedure continues to operation 240. Although the integrity checking is first performed on the hardware regional code in the present exemplary embodiment, the integrity checking may be first performed on the firmware regional code in another exemplary embodiment.

In operation 240, a regional code is extracted from the firmware.

In operation 250, an MAC or signature is extracted from the firmware. The extracted MAC or signature is required to perform integrity checking on a firmware regional code extracted from the firmware of the digital content storage device. Preferably, but not necessarily, the firmware regional code is compared with the hardware regional code after the integrity checking since the firmware regional code may change.

In operation 260, the integrity checking is performed using the extracted MAC or signature. The digital content storage device operates abnormally if the result of the integrity checking is not successful. On the other hand, upon passing the integrity checking, the procedure continues to operation 270.

In operation 270, the hardware (i.e., memory) regional code is compared with the firmware regional code.

In operation 280, the digital contents are encrypted according to the comparison result. The digital content storage device operates abnormally if the hardware regional code does not coincide with the firmware regional code. On the other hand, if the two regional codes are identical, the digital contents are encrypted according to the regional code. As described above, the regional code may only decide whether to encrypt the digital contents. In addition, the regional code may specify an encryption method.

Figure 3:
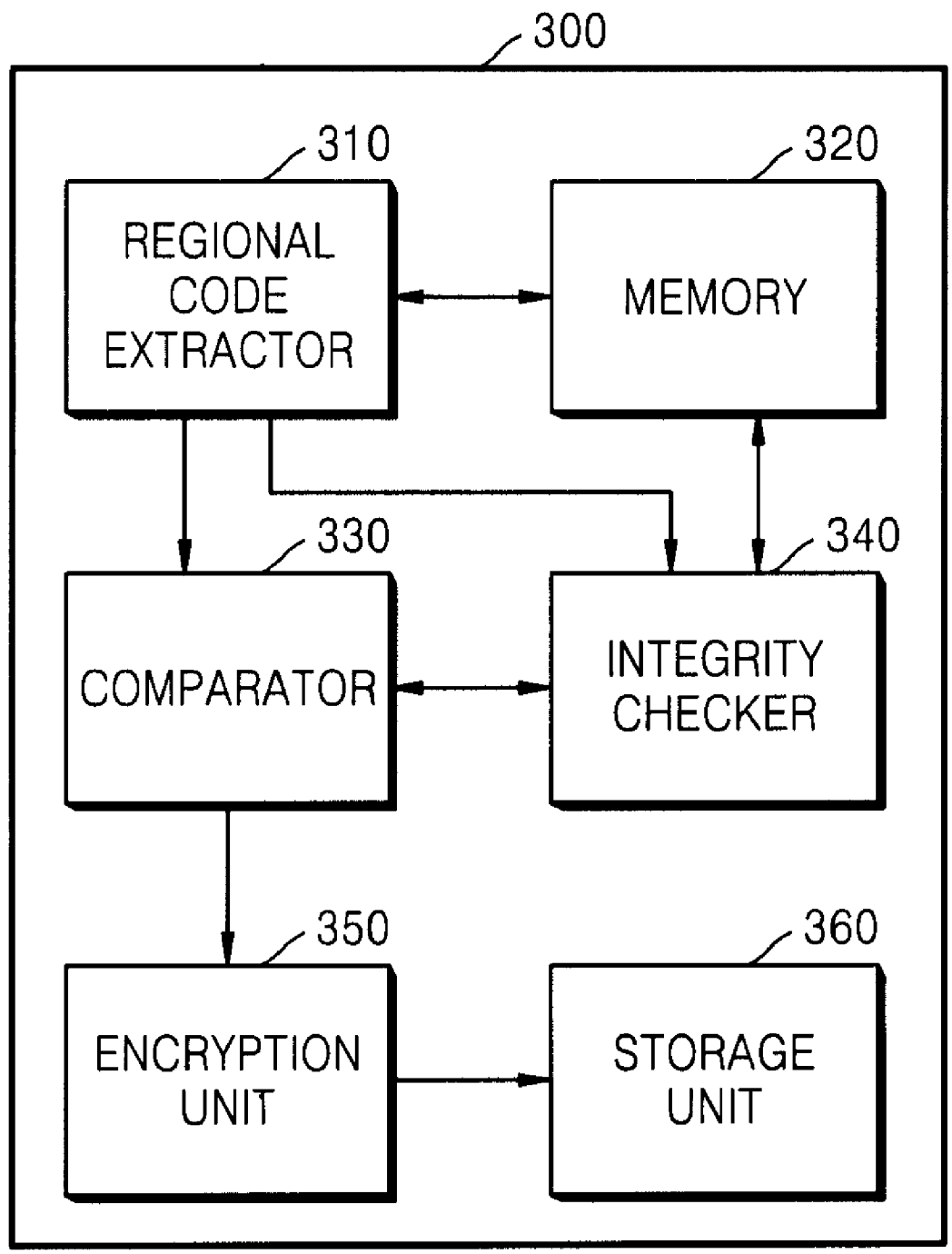
FIG. 3 is a block diagram of an apparatus for storing digital content according to an exemplary embodiment of the present invention.

FIG. 3 is a block diagram of an apparatus for storing digital content according to an exemplary embodiment of the present invention.

Referring to FIG. 3, a digital content storage device 300 includes a regional code extractor 310, a memory 320, a comparator 330, an integrity checker 340, an encryption unit 350, and a storage unit 360.

The regional code extractor 310 extracts regional codes from firmware (not shown) and the memory 320. The memory 320 may be an EEPROM.

The integrity checker 340 extracts from the memory 320 a signature or MAC for the hardware regional code of the digital content storage device 300. The integrity checker 340 extracts from the firmware a signature or MAC for the firmware regional code, and performs integrity checking on the firmware regional code.

The comparator 330 compares the hardware regional code with the firmware regional code after the integrity checking is performed.

The encryption unit 350 selectively encrypts the digital contents according to a corresponding regional code only when the comparison result of the comparator 330 shows that the hardware regional code coincides with the firmware regional code. Selective encryption means that encryption may, or may not, be performed. In addition, an encryption method may differ depending on which regional code is used.

The storage unit 360 stores the digital content encrypted by the encryption unit 350.

According to the present invention, it is possible to prevent a user from freely copying and distributing digital content having different regional protection policies by changing the firmware or the hardware of a digital content storage device.

The invention can also be embodied as computer-readable codes on a computer-readable recording medium. The computer-readable recording medium is any data storage device that can store data which can be thereafter read by a computer system. Examples of computer-readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of processing digital content performed by an apparatus for storing digital content, the method comprising:
   extracting a regional code from firmware installed in the apparatus, wherein the regional code represents a geographic region for distributing digital content;
   comparing the extracted firmware regional code with a regional code stored in a memory of the apparatus;
   encrypting selectively the digital contents according to a result of the comparing.

2. The method of claim 1, further comprising checking an integrity of the extracted regional code, wherein the comparing is performed only if the extracted regional code passes the checking the integrity.

3. The method of claim 2, wherein the checking the integrity of the extracted regional code is performed using a signature or a message authentication code (MAC) of the extracted regional code; and
   wherein the signature or MAC is extracted from the firmware.

4. The method of claim 1, further comprising checking an integrity of the regional code stored in the memory, wherein the comparing is performed only if the regional code stored in the memory passes the checking the integrity.

5. The method of claim 4, wherein the checking the integrity of the regional code stored in the memory is performed using a signature or a message authentication code (MAC) of the regional code stored in the memory, and
   wherein the signature or the MAC is extracted from the memory.

6. The method of claim 1, wherein the memory is an electrically erasable and programmable read only memory.

7. The apparatus of claim 1, wherein the memory is an electrically erasable and programmable read only memory.

8. A non-transitory computer-readable storage medium having embodied thereon a computer program for executing a method, by a processor, of processing digital content performed by an apparatus for storing digital content, the method comprising:
   extracting a regional code from firmware installed in the apparatus, wherein the regional code represents a geographic region for distributing digital content;
   comparing the extracted firmware regional code with a regional code stored in a memory of the apparatus; and
   encrypting selectively the digital contents according to a result of the comparing.

9. An apparatus for storing digital content, the apparatus comprising:
   a regional code extractor which extracts a regional code from firmware installed in the apparatus, wherein the regional code represents a geographic region for distributing digital content;
   a comparator which compares the extracted firmware regional code with a regional code stored in a memory of the apparatus to obtain a comparison result; and
   an encryption unit which selectively encrypts the digital content according to the comparison result.

10. The apparatus of claim 9, further comprising an integrity checker which checks an integrity of the extracted regional code, wherein the comparator performs the comparing only if the extracted regional code passes the integrity check.

11. The apparatus of claim 10, wherein the integrity checker checks the integrity of the extracted regional code using a signature or a message authentication code (MAC) of the extracted regional code; and
   wherein the signature or the MAC is extracted from the firmware.

12. The apparatus of claim 9, further comprising an integrity checker which checks an integrity of the regional code stored in the memory, wherein the comparator performs the comparing only if the regional code stored in the memory passes the integrity check.

13. The apparatus of claim 12, wherein the integrity checker checks the integrity using a signature or a message authentication code (MAC) of the regional code stored in the memory, and
   wherein the signature or the MAC is extracted from the memory.

* * * * *